Patented May 5, 1931

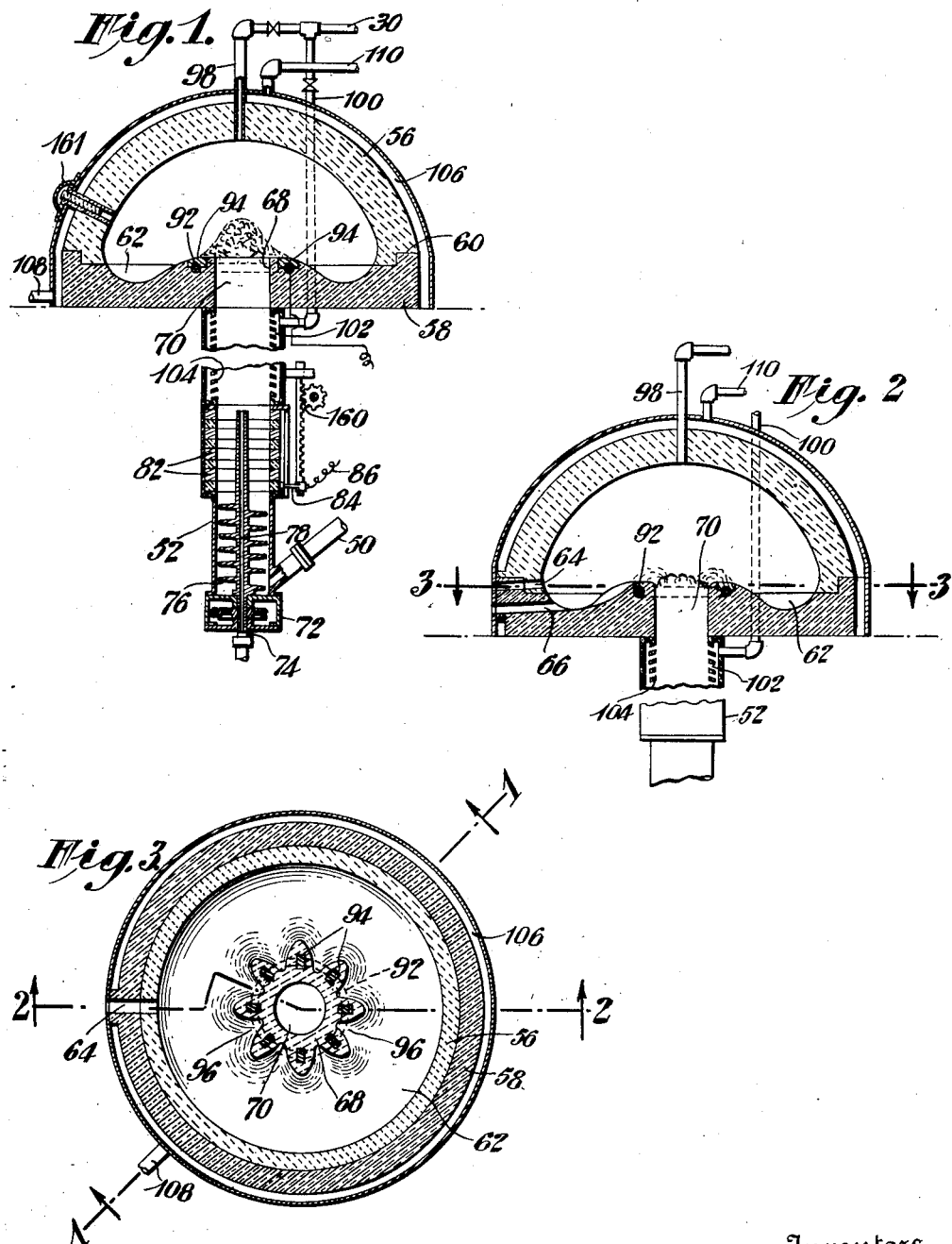

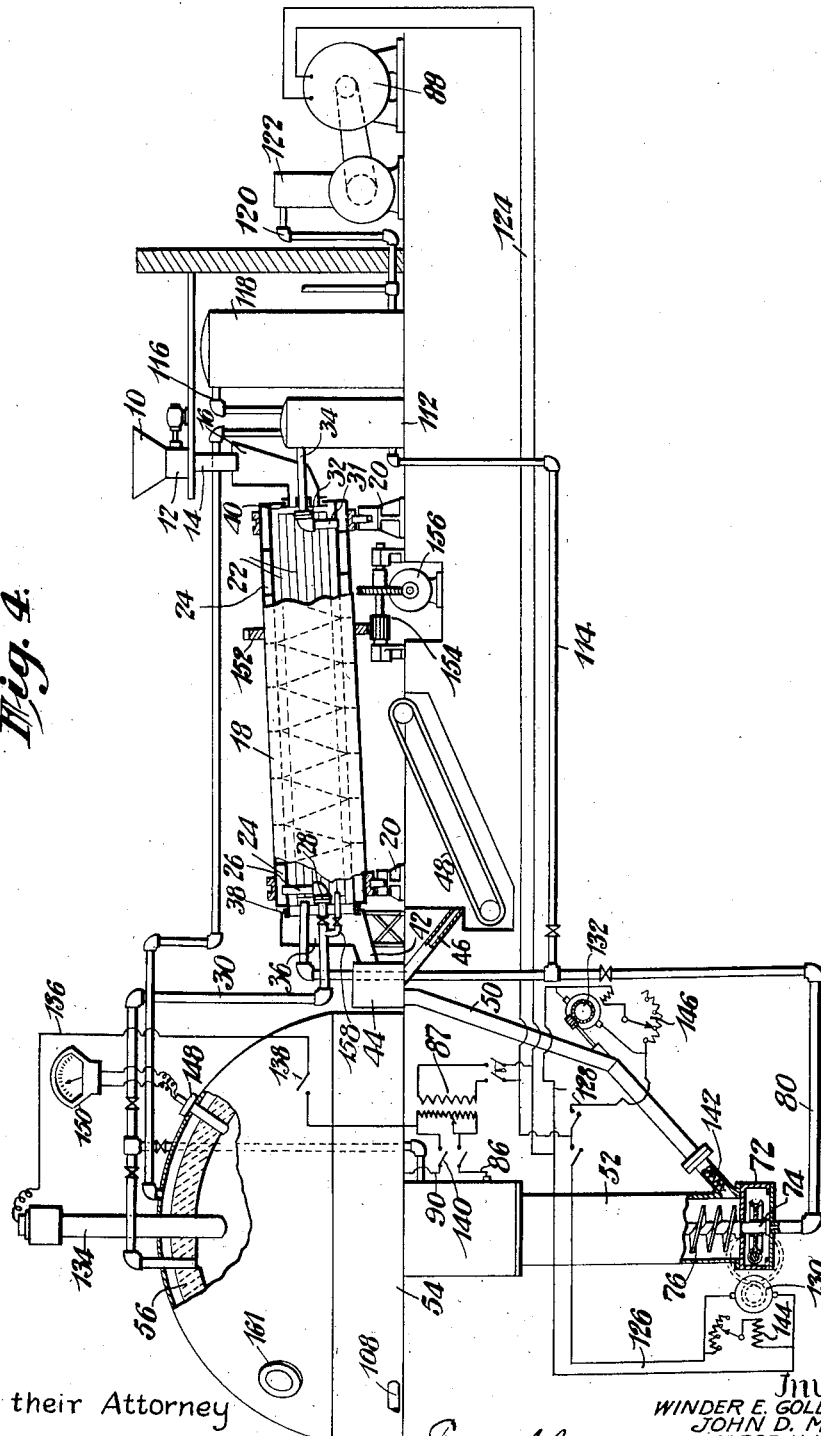

1,804,161

UNITED STATES PATENT OFFICE

WINDER E. GOLDSBOROUGH, OF SOUTH NORWALK, CONNECTICUT, JOHN D. MORGAN, OF SOUTH ORANGE, AND GEORGE HAMPTON WYCKOFF, OF MOUNTAIN LAKES, NEW JERSEY, ASSIGNORS TO DOHERTY RESEARCH COMPANY, OF NEW YORK, N. Y., A CORPORATION OF DELAWARE

METHOD OF AND MEANS FOR PRODUCING MOLTEN AND REFINED METAL FROM CRUDE ORES

Application filed August 17, 1927, Serial No. 213,482. Renewed September 20, 1930.

This invention relates to a method of and apparatus for producing molten and refined metals from their crude ores, and more particularly to the electrical smelting and refining of iron or steel directly from crude iron ores.

One of the primary objects of the present invention is to provide method and means for effecting continuous and economical smelting and refining of metals, particularly ferrous metals, from their crude ores.

Another object of the invention is to provide method and apparatus design to use electrical energy in effecting the efficient and economical smelting and/or refining of electrically conductant metals.

Another object of the invention is to provide method and means for utilizing the well-known sponge iron reduction treatment of crude iron ores as a preliminary step in the production of molten and/or refined ferrous metals from their crude ores.

There are numerous furnaces commercially available, designed to use electric current as the source of energy for heat-treating metals and other materials. In general, however, the field of application of most of the electric heat-treating furnaces at present available is somewhat limited because the individual furnaces can be operated only through a restricted temperature range, which in turn is dependent on the manner in which the electric energy is applied to the material under treatment in the furnace. Thus a so-called resistance furnace, that is, one designed to heat a charge of relatively conductant material by passing an electric current therethrough, is ordinarily limited in its field of service to working temperatures below approximately 3000° F. Such temperatures are insufficient for suitably smelting and refining many types of metals and alloys. On the other hand, electrical furnaces designed to utilize high potential arcs as the source of heat cannot be operated satisfactorily at temperatures much below 4000° F. owing to the intense and localized heating effects which are set up therein, and accordingly such furnaces are entirely unsuited for carrying on many types of smelting and refining operations, particularly those involving the heat treatment of metals or other materials volatile below such temperature.

Accordingly another important object of the present invention is to provide a heat treating furnace capable of operation with electrical energy as the source of heat throughout a wider range of temperatures and with a resultant wider field of service than electrical heat treating furnaces now commercially available.

With this object in view one feature of the present invention contemplates a metal smelting and refining furnace capable of utilizing electrical current as the sole source of energy for carrying out heat treating operations throughout the temperature ranges most efficiently covered by both resistance and arc heating.

Another feature of the invention contemplates an electric heat treating furnace designed for use with both resistance and arc heating, wherein the character of current application used is under one simple control and can be varied by simply varying the rate of charge input to the furnace to thereby automatically maintain any desired temperatures.

Another object of the present invention is to provide an electric smelting and refining furnace which is relatively simple and inexpensive in construction and maintenance, and in which electrode expense is reduced to a minimum.

With these and other objects and features in view the invention consists in the novel method and means for smelting and refining metals from their crude ores hereinafter described and more particularly defined in the claims.

The various features of the invention are illustrated in the accompanying drawings, in which:

Fig. 1 is a vertical elevation, in diametrical section, of the preferred type of electric smelting and refining furnace element of the apparatus of the present invention, illustrating the position assumed by the charge column during periods in which the furnace is operated with resistance heating;

Fig. 2 is another cross sectional view of the upper portion of the furnace illustrated in Fig. 1, taken on the line 2—2 of Fig. 3, and showing the position assumed by the charge column when the furnace is operated with arc heating.

Fig. 3 is a cross sectional plan view of the hearth of the furnace taken on the line 3—3 of Fig. 2.

Fig. 4 is a diagrammatic or flow sheet view, in vertical elevation with parts broken away, of the assembled apparatus units requisite for carrying out the complete process of the invention.

In the drawings, the numeral 10 (see Fig. 4) indicates a hopper arranged to feed crude charge materials through a pulverizer and/or mixer and/or proportioning device 12 and a chute 14 into the feed hopper 16 of a slightly inclined low temperature reduction furnace 18. Furnace 18 is rotatably mounted on supports 20, and longitudinal shelves or riffles 22 are preferably provided on its interior lining in order to produce a showering effect of charge material within the body of the kiln during periods in which the kiln is revolved above its supporting members 20. In the drawings the kiln is illustrated as surrounded by an exterior heating jacket comprising a helical flue 24 through which hot gases or other heating medium may be circulated for the purpose of supplying heat to the interior of the kiln. In the particular exemplification of the apparatus shown in Fig. 4 a short elbow connection 26, joined by a flexible gas-tight connection 28 aligned with the central axis of the shaft, to a gas supply line 30, forms the means for introducing heating gases to the flues 24, while similar pipe connections 31, 32 and 34 positioned at the upper end of the kiln serve for the removal of the stream of cool heating gas from the opposite end of flue 24. A stationary chamber 36 communicates with the lower or discharge end of the kiln 18 through a substantially gas-tight flexible sealed connection 38, analogous in construction with a similar connection 40 between the upper end of the kiln and the hopper 16. A chute 42 leads off from the base of chamber 36 into a magnetic or air separating mechanism 44. A chute 46 for waste material leads off from separator 44, this chute being shown in the drawings as arranged to discharge the waste material onto the lower end of a traveling belt conveyor 48. Another feed chute 50 serves for conducting useful purified charge material from the separator 44 into the lower end of a feed chute or barrel segment 52 of an underfeed electric smelting and refining furnace 54. Refining fluxes such as lime, hæmatite and the like may be fed into the feed chute to mix with the reduced iron.

Furnace 54, as it is illustrated more particularly in Figs. 1, 2 and 3 embodies among its important features a dome roof 56 of refractory and poorly heat conductant material, said roof resting on a hearth 58 with which it forms a tight joint along the line 60. The hearth 58 is preferably constructed of some material which is a poor conductor for heat and also substantially non-conductant to electrical current. It is also important that the material of which the hearth 58 and the roof 56 of the furnace is constructed shall be capable of resisting high temperatures. An annular trough or sump 62 is built into the floor of the hearth 58 and two tap holes 64 and 66 are provided near the lowest portion of the floor of the trough 62 for the purpose of removing slag and refined metal, respectively, from the furnace. A central portion or boss 68 of the hearth is elevated well above the normal top level of molten material within the trough 62, and a central circular feed aperture 70 is cut in the floor of the hearth through the centre of boss 68, connecting the interior of the furnace above the hearth with the interior of the underlying feed barrel 52. Feed barrel 52, as it is illustrated in the drawing, comprises an upright hollow cylinder closed at its lower end by a gear box 72 in which there is journaled the hollow drive shaft 74 of a feed screw mechanism 76. A central hollow aperture 78 in the shaft 74 of the feed screw mechanism connects the interior of the feed barrel 52 with a pipe 80. through which hot gasses may be passed from an outside source, hereinafter more fully described, into the center of a charge of material in feed barrel 52. A number of short ring sections 82 of the cylindrical inner wall of feed barrel 52 are preferably constructed of electrically conductant and low heat conductant material. These sections are insulated from each other and are designed to function as contact elements through which electric current enters a charge of material in the feed barrel 52 from a movably mounted contact fitting 84 and electrical connection 86 leading off through a transformer 87 from one of the oppositely charged terminals of an electrical generating unit 88 (see Fig. 4). The other terminal of the electrical generator 88 is joined by a connection 90, through transformer 87, with an annular insulated conductor 92 built into the boss 68 of the furnace hearth a predetermined spaced distance from the feed aperture 70. A number of electrodes 94, preferably of graphite, are embedded in the boss 68 of the furnace hearth at equally spaced intervals about the aperture 70 (see Fig. 3), these electrodes serving as outlets through which electrical current may be transmitted from the conductor 92 to the surface of the hearth floor. Radially extending channels or drains 96 are built into the floor of the boss 68 between each pair of electrodes 94 for the purpose of permitting molten metal formed at the top of a charge column of material feeding onto the furnace hearth through aperture 70 to flow into trough 62 without short-circuiting electric arcs cast from electrodes 94 to the top of the charge column. The conductor 92 is preferably hollow and water-cooled, and is so deeply embedded in the non-electrically conductant material making up the hearth 58 that there will be no danger of leakage of current to material supported on the surface of the hearth except through the electrodes 94.

A pipe connection 98 opens out through the roof of the furnace and serves for leading off hot gases and fumes liberated from the charge under treatment in the furnace to gas main 30. A valve by-pass pipe 100 connects main 30 with an annular chamber 102 built into the wall of the furnace feed barrel and openly communicating with the interior of the feed barrel through openings in a perforated cylindrical screen 104. In the drawings the roof 56 of the smelting and refining furnace is illustrated as equipped with a water jacket 106 having a cooling water inlet 108 and a hot water or steam outlet 110. Hot water connection 110 is shown in Fig. 4 as leading to the water section of a waste heat steam boiler 112. It will be noted that a valved connection 114 is provided between the heating section of boiler 112 and gas pipe 80, while the gas connection 34 leading off from the flues 24 of the low temperature reduction kiln 18 also opens into the heating space of boiler 112. Any combustible gas which may be passed through the heating sections of boiler 112 can be led off through a pipe connection 116 into a condensing and scrubbing unit 118, and purified gas removed from this condensing unit may be passed by a connection 120 to a gas engine 122.

The electrical equipment by means of which the various apparatus elements of the present invention are operated includes a main circuit 124, connecting the generator 88 with the electrodes of the underfeed furnace through the adjustable transformer 87, and supplementary circuits 126 and 128 leading off from the main circuit respectively to variable speed motors 130 and 132.

In Fig. 4 the underfeed furnace is shown equipped with a starting electrode 134 movably mounted over the hearth of the furnace above the aperture through which the charge column feeds upwardly onto the hearth. A connection 136 controlled by switch 138 serves to place this starting electrode in circuit with the transformer 87 and the main generator circuit,—the power supply to conductor 92 in the boss of the furnace hearth being preferably cut off by a switch 140 in connection 90 during the brief intervals in which current is supplied to electrode 134 for the purpose of developing quick heats in the furnace by casting an arc from the electrode 134 to the top of the charge column.

The variable speed motor 130 has its drive shaft connected by an adjustable speed gear train to the drive shaft 74 of the feed screw 76. Likewise variable speed motor 132 has its drive shaft connected by a similar gear train to a feed screw 142 mounted in the feed chute 50 (see Fig. 4). Thus by adjusting the settings of rheostats 144 and 146 mounted respectively in the shunt field circuits of motors 130 and 132 or the sizes of gears in the connecting trains the rate at which charge material is supplied to the furnace hearth can be varied as desired. A thermo-couple 148 mounted in the dome of the furnace and having its leads connected with a temperature indicating device 150 affords the means for indicating the temperature maintained within the furnace.

The reduction furnace 18 is rotated by an annular gear 152 driven through a gear train 154 by motor 156.

In the drawings Fig. 1 shows the underfeed furnace and the top of the charge column therein in the relation which they bear to each other at the time the furnace is operated as a purely resistance furnace, the current passing directly into and through the charge from the adjustable contact fitting 84 and the conductor segment 82 with which it is in contact, thence through the electrodes 94 and conductor 92 back to the generator 88. In Fig. 2 the furnace and top of charge column are shown in the relation which they bear to each other when the furnace is operating as an arc furnace, the current being projected as an arc from the top of the charge column to the electrodes 94 and thence back through the conductor 92 and connection 90 to the generator 88.

The furnace hearth and dome are preferably constructed of an insulating refractory material such as bonded zircon, which in addition to offering remarkable resistance to high temperatures, abrasion and chemical action is also practically non-conductant to both heat and electrical current at all temperatures. The upper part of the feed cylinder is also preferably lined or composed of bonded zircon or other insulating refractory material capable of withstanding the high temperatures maintained near the top of the charge column.

The process of the present invention is carried out in the apparatus illustrated in the drawings and above described, substantially as follows, it being assumed for the purposes of this description that the method and apparatus of the invention are applied to the production of refined iron or steel directly from crude iron ore. A pulverized and intimately mixed and suitably proportioned charge of iron ore and coal or coke breeze or almost any low grade sub-bituminous non-caking carbonaceous fuel is fed from device 12 through chute 14 into hopper 16 and thence into the upper charge end of the inclined low temperature reduction kiln 18. As the charge mixture is gradually advanced through the kiln by reason of the rotation of the kiln, it is brought into intimate contact with the inner walls of the kiln and thereby heated by indirect heat transfer with hot gases passed through the helical flue 24 in the wall of the kiln. A further heating of the charge mixture in the low temperature reduction kiln may, if desired, be effected by passing a part of the hot gases from the electric refining furnace 54 into direct contact with the charge material within the kiln, through a valved connection 158. The rate at which the finely ground charge mixture is passed through the low temperature reduction kiln is preferably controlled, as by controlling the rate of speed of rotation of the kiln, and the temperature and volume of hot gases passed through the flues 24 is also controlled to raise the temperature of the charge to a temperature approaching closely to but maintained slightly below 1000° C., whereby the ore is reduced to the condition of sponge iron with the evolution of gases consisting chiefly of carbon monoxide. Due to the fact that a reducing atmosphere is maintained on the interior of the kiln and by maintaining temperatures within the lower end of the kiln below 1000° C., the reduction of the ore to the sponge iron state is effected without substantial melting of the iron or fusion of the gangue associated therewith. From the lower end of the low temperature reduction kiln the charge material advances into chamber 36 wherein it may be cooled sufficiently to restore magnetic properties to the sponge iron formed in the kiln. The sponge iron and impurities in the charge material may then be passed by chute 42 to a magnetic separator 44 wherein the metallic sponge iron is separated from the gangue. A non-oxidizing fluid separator may be used in place of the more common magnetic separator, in which case any substantial cooling of the charge in the chamber 36 for the purpose of restoring its magnetic properties may be dispensed with.

The purified sponge iron discharged from separator 44 is fed, admixed with a small amount of carbonaceous material, through the chute 50, either by gravity or preferably by means of the screw conveyor 142, arranged to be driven at variable speed, into the base of the feed barrel 52 of furnace 54. Refining fluxes such as lime, hæmatite, fluorspar and the like, may be fed into top of the feed chute 50 in admixture with the reduced iron leaving the separator. From the base of the feed barrel the sponge iron charge is fed vertically upward in a column at a continuous and controlled rate to the hearth of the furnace by the variable speed feed screw 76. Any steam and hot gases introduced into the charge column through the aperture 78 in the feed screw shaft are broken down into reducing gases, including hydrogen and carbon monoxide, and the gas thus introduced assists in preheating the lower portion of the charge column. The gases thus introduced may be withdrawn from the charge column through the chamber 102 and by-pass connection 100, or they may be supplemented in volume by additional hot gases introduced through by-pass 100 and chamber 102, the whole supply of heating and reducing gases thus introduced into the charge column being removed from the top of the column into the body of the furnace and thence out through main gas offtake 30. In passing upwardly through the feed barrel 52 an electrical contact is made between the charge column of sponge iron and the annular charged shoe or electrode 82 in the wall of the feed barrel so that the upwardly moving column of sponge iron and carbon is thereby caused to serve as one electrode of the furnace. Due to its resistance to the passage of current through this upwardly moving column of sponge iron and carbon the charge acquires a considerable degree of preheat. The position of the movable contact fitting 84 is preferably made adjustable with respect to its point of contact with one of the several annular shoes 82, as by means of a rack and pinion device 160, thereby affording a control of the degree of preheat imparted to the charge.

As already indicated, the furnace 54 is designed to be used spasmodically as either a pure resistance type or as a pure arc type furnace, or as a combination of both, depending on the rate of feed of the charge column upwardly through the barrel 52. When the charge column is fed upwardly with sufficient rapidity so that material builds up above the mouth of aperture 70 to a height at which it will continuously drop over onto the carbon electrodes 94, a closed circuit is formed by the charge column for the electric current flowing between electrodes 82 and 94, so that the only heat acquired by the charge is that set up by the resistance to the flow of current therethrough. By feeding the charge upwardly through the barrel 52 at a slower rate material can be caused to drop off from the top of the charge column only intermittently onto the carbon blocks 94, and with this method of operation the heating of the charge column will be partly by resistance heating and partly by heat radiated from the arcs cast between the top of the charge column and carbon blocks 94 during the intervals in which there is no direct contact through charge material between the top of the column and the electrodes. By feeding the charge column upwardly through the barrel at an even slower rate the heating of the top of the charge column may be effected almost entirely by arc heating. The heat given off from the arcs is so intense that the material forming the top of the charge column is rapidly reduced to a molten state, and as soon as it reaches the molten state the iron flows off through the channels into the trough 62 in the floor of the hearth, wherein it undergoes further heat treatment, and refining treatment if desired, prior to its removal as refined metal through the tap hole 66. By varying the amount of refining fluxes admixed with the reduced iron at the top of the feed chute 50 for the purpose of removing impurities from the iron during the refining operation, the resistance of the charge column forming one electrode of the refining furnace can be varied as desired. Refining fluxes may also be added to the molten metal in the hearth of the furnace through a normally tightly closed and sealed charge door 161. In carrying out the production of refined steel or pig iron from crude ores according to the process of the present invention the furnace is normally operated part of the time by resistance heating and part of the time by arc heating, with a variable rate of feed of charge material to the furnace hearth, the proportions of time devoted to resistance and arc heating respectively being adjusted as desired.

The gases generated in the high temperature furnace are removed through the offtake 30, and after passing through a dust and fuel precipitator (not shown) are preferably conducted to the heating flues 24 of the low temperature reduction kiln, thence through the steam generator, their sensible heat and if necessary part of their potential heat, being utilized in both of these apparatus units. From the steam generator the cool gas is passed to the scrubber and thence either to storage or directly to a power unit, such, for example, as an internal combustion engine 122 or steam boiler and engine set, wherein the remaining potential heat of the gas is utilized in developing power wherewith to drive the generator 88 with which to produce the electrical energy for the operation of the various apparatus elements of the invention.

The thermocouple over the furnace hearth may, if desired, be hooked up with automatic control devices by means of which the variations in current set up in the thermocouple by variations in the furnace temperature may be utilized to operate relays (not shown) whereby to change the speed of the feed screw 76 and thereby vary the rate of charge input into the furnace to maintain the top of the charge column at a point resulting in the desired furnace temperature. The molten metal formed at the top of the charge column trickles down through the channels 96 to the annular trough in the furnace hearth and is continually replaced by fresh preheated charge material moved upwardly through the feed barrel 52. The molten refined metal in the annular trough of the hearth sinks to the bottom of the trough below the slag and impurities and is withdrawn after it has reached the desired stage of refinement.

One of the principal apparatus features of the present invention is the electrically heated underfeed metal heat treating furnace, designed for operation with either or both resistance and arc heating with an accurate, simple and effective control of temperatures developed through one factor of operation, namely the variable control of rate of charge input. Other features of the furnace are the provision of means for maintaining a reducing atmosphere in the furnace, means for reducing radiation losses from the furnace, means for obviating danger from electrical short-circuiting, and means for effecting efficient preheating of the charge and efficient utilization of heat developed during the smelting and refining operation. By the process of the present invention the sensible and potential heat of all gases generated in the smelting and refining operation are recovered and utilized in generating steam, in reducing the raw ore to the sponge iron state, in providing reducing atmospheres and promoting a desirable chemical purification of the furnace charge as well as in preheating the charge, and in generating a large proportion and some times all of the electrical energy required for operating the several apparatus units. Another feature contributing materially to the economical operation of the process is that by subjecting the raw ore to a preliminary reduction treatment followed by separation of a large part of its gangue content, the fuel and heat requirements of the smelting and refining operation are materially reduced.

The process of the present invention makes it possible to utilize relatively low grade and inexpensive carbonaceous materials as the fuel medium wherewith to reduce the raw ore to the sponge iron state and to produce the gases from which power for generating the electrical energy required in the refining operations is developed. Thus by the use of such cheaper carbonaceous material the costs of smelting and refining the ore are materially reduced.

The underfeed furnace design is such that electrode expense is reduced to a minimum. Thus in addition to using the ore charge as one electrode the other electrodes are preferably formed of finely divided carbon rammed into suitable cavities formed in the central boss of the furnace hearth. Electrodes of this type are not only easily and cheaply renewed, but they also have a relatively long life because of the fact that they are largely protected from abrasion and from burning out or distortion. One great factor in the relatively low electrode expense of the underfeed furnace of the present invention is that the charge column serves as one of the electrodes during periods in which arc heating is employed. Any repair work to the furnace, such as renewal of the electrodes in the floor of the central boss, is greatly facilitated by reason of the construction of the furnace dome as a separate unit from the hearth so that it may be readily and quickly lifted off from the hearth whenever desired.

It will be noted that any predetermined temperature may be maintained in the furnace of the present invention simply by varying the rate of charge input in an inverse proportional relation to the variations in the temperatures desired within the furnace. Such control of furnace temperature may be effected either manually or automatically. The rate of charge input to the furnace is the sole factor governing the manner of electrical heating of the charge. That is, by decreasing the rate of charge input the manner of heating the charge may be changed from resistance to arc heating, and by increasing the rate of charge input the operation may be changed back from arc to resistance heating. The upwardly moving charge column of the furnace serves not only as an arc electrode but also as an electric resistor. Thus the furnace functions as a resistance furnace during periods in which the top of the upwardly moving charge column, serving as an electrode, is sufficiently elevated above the level of the fixed electrodes on the floor of the hearth so that the charge material at the top of the charge column will establish contact between the top of the charge and the fixed electrodes. In the same way when the top of the upwardly moving charge column is not elevated sufficiently above the level of the fixed electrodes to cause the charge material to establish contact between the top of the charge and the fixed electrodes, the furnace will function as an arc furnace.

Having thus described our invention, we claim:

1. A process for producing refined metal from crude iron ore comprising intimately mixing a charge of the finely ground ore with a carbonaceous fuel, heating said mixture in a reducing atmosphere to a temperature at which sponge iron is formed, separating the sponge iron thus formed from the non-ferrous impurities, continuously feeding the purified sponge iron in a charge column upwardly toward the hearth of an electrically heated refining furnace, heating the upwardly moving charge column by resistance to an electric current passed therethrough, exposing the top of the charge column to a refining temperature above its melting point by casting an electric arc between the top of the charge and an electrode of opposite polarity spaced from the top of the charge in the refining furnace, and collecting and further heat treating the molten metal formed at the top of the charge in the hearth of said furnace.

2. In a process for producing refined metal from crude iron ore involving the production and purification of sponge iron as an intermediate step, the additional steps comprising forming an upwardly moving charge column of the sponge iron product of said intermediate step, preheating said charge column, utilizing said charge column as an electrode from the top of which to cast an arc to an electrode of opposite polarity disposed in a refining furnace at the top of said charge column, and controlling the temperature to which the top of the charge column is exposed by varying the rate at which the charge column is advanced upwardly toward the furnace hearth.

3. In a process for producing refined metal from crude iron ore involving the production and purification of sponge iron as an intermediate step, the additional steps comprising forming an upwardly moving charge column of the spong iron product of said intermediate step, preheating said charge column, intermittently utilizing said charge column as an electrode from the top of which to cast an arc to an electrode of opposite polarity disposed in a refining furnace at the top of said charge column, controlling the temperature to which the top of the charge column is exposed by varying the rate at which the charge column is advanced upwardly toward the furnace hearth, and withdrawing molten metal liberated at the top of said charge column onto the floor of the furnace hearth and further heat-treating and refining said metal.

4. A process for producing refined metal from crude iron ore comprising mixing a charge of the ore with a carbonaceous fuel, heating said mixture in a reducing atmosphere to a temperature at which sponge iron is formed, separating the sponge iron thus formed from non-ferrous impurities, continuously feeding the purified sponge iron in a charge column upwardly toward the hearth of an electrically heated refining furnace, heating the upwardly moving charge column by passing an electric current therethrough, exposing the top of the charge column to a refining temperature above its melting point by casting an electric arc between the top of the charge and an electrode of opposite polarity spaced from the top of the charge in the refining furnace, collecting and further heat treating the molten metal formed at the top of the charge in the hearth of said furnace, and utilizing the sensible and potential heat of gases formed in the reduction furnace and in the refining furnace to supply heat for the production of the sponge iron and to generate electrical energy for use in the refining operation.

5. In a process for producing refined metal from crude iron ore involving the production and purification of sponge iron as an intermediate step, the additional steps comprising forming an upwardly moving charge column of the sponge iron product of said intermediate step, utilizing said charge column as an electrode from the top of which to intermittently cast an arc to an electrode of opposite polarity disposed in a refining furnace at the top of said charge column, controlling the temperature to which the top of the charge column is exposed by varying the rate at which the charge column is advanced upwardly toward the furnace hearth, and maintaining a reducing atmosphere in the body of the charge column below the hearth of the refining furnace by introducing non-oxidizing gases therein.

6. In a process for producing refined molten metal from its crude ore embodying the preliminary steps whereby the ore is pulverized and treated to a reduction treatment to purify its metal content and render it conductant to electric currents, the additional steps comprising forming an upwardly moving charge column of the said reduced metal, maintaining a reducing atmosphere in contact with said charge column, exposing the top of the charge column to a desired refining temperature by utilizing the charge column as an electrode from which to cast an electric arc to an electrode of opposite polarity mounted in the refining furnace, and varying the temperature to which the material at the top of the charge column is exposed in inverse proportional relation to variations in the rate at which the charge material is fed upwardly through the column.

7. In a process for producing refined molten metal from its crude ore embodying the preliminary steps whereby the ore is pulverized and treated to a reduction treatment to purify its metal content and render it conductant to electric currents, the additional steps comprising forming an upwardly moving charge column of the said reduced metal, utilizing said charge column as a resistance conductor of the electric current and as an electrode from the top of which to cast an arc to an electrode of opposite polarity mounted in a refining furnace overlying such charge column, and exposing the material at the top of the charge column to desired smelting and refining temperatures, said temperatures being varied in inverse proportional relation with variations in the rate at which charge material is fed upwardly through said column.

8. A process for producing refined metal from its crude ores comprising intimately mixing a charge of the finely ground ore with suitable amounts of a carbonaceous fuel, heating said mixture in a reducing atmosphere to a temperature at which the desired metal content of the said ore is reduced to a state in which it is conductant to electric current, separating the reduced metal thus formed from non-metallic impurities, continuously feeding the reduced metal upwardly in a charge column toward the hearth of an electrically heated refining furnace, passing an electric current therethrough, and exposing the top of the charge column to a desired refining temperature by utilizing the charge column as an electrode from which to cast an arc to an electrode of opposite polarity mounted in the refining furnace.

9. A process for producing refined metal from its crude ores comprising intimately mixing a charge of the finely ground ore with suitable amounts of a carbonaceous fuel, heating said mixture in a reducing atmosphere to a temperature at which the desired metal content of the said ore is reduced to a state in which it is conductant to electric current, separating the reduced metal thus formed from non-metallic impurities, continuously feeding the reduced metal upwardly in a charge column toward the hearth of an electrically heated refining furnace, passing an electric current therethrough, exposing the top of the charge column to a desired refining temperature by utilizing the charge column as an electrode from which to cast an electric arc to an electrode of opposite polarity mounted in the refining furnace, and varying the temperature to which the material at the top of the charge column is exposed in inverse proportional relation to variations in the rate at which the charge material is fed upwardly through the column.

10. In a process for producing refined metal from its crude ores embodying the preliminary steps whereby the desired metal content of the said ore is reduced to a metallic state, the additional steps comprising feeding said reduced metal upwardly in a charge column toward the hearth of an electrically heated refining furnace at a variable rate, and controlling said rate of feed so that during certain intervals charge material dropping off the top of said charge column onto the hearth of said furnace will close an electric circuit through said charge column, while at other intervals material at the top of said charge column will be reduced to a molten state by the heat of an electric arc cast from the top of said charge column.

11. Apparatus for producing refined metal from crude iron ore including pulverizing, mixing, and proportioning equipment for preparing a suitable charge of the ore admixed with a carbonaceous fuel, means for conducting the mixture thus formed into a low temperature sponge iron reduction furnace, means for treating the crude sponge iron formed in said furnace to separate non-ferrous impurities therefrom, means for introducing the thus-purified sponge iron into the feed barrel of an underfeed electrically heated refining furnace, an electrode mounted in the wall of said feed barrel, another electrode of opposite polarity mounted in the hearth of said furnace and spaced from the upper rim of said feed barrel, and means for advancing a charge column of sponge iron upwardly at a variable controlled rate through said feed barrel onto said furnace hearth.

12. In apparatus for producing refined metal from crude iron ore, the combination with equipment for preparing and purifying charges of sponge iron from said ore, of an electrically heated under-feed refining furnace including an upright cylindrical feed barrel opening at its top onto a furnace hearth, means for conducting sponge iron from the aforementioned equipment into the base of said feed barrel, electrodes of opposite polarity mounted respectively on the inner wall of said feed chute and in the floor of the hearth spaced from the upper rim of said feed chute, means for advancing a charge column of said sponge iron at a variable rate upwardly through said feed chute onto the overlying hearth, and means for introducing heated non-oxidizing gases into the upwardly moving charge column in said feed chute.

13. In apparatus for producing refined metal from crude iron ore the combination with equipment for preparing and purifying charges of sponge iron from said ore, of an electrically heated underfeed refining furnace including an upright cylindrical feed barrel opening at its top onto an annular furnace hearth, means for conducting sponge iron from the aforementioned equipment into said feed barrel, electrodes of opposite polarity mounted respectively on the inner wall of said feed barrel and in the floor of the hearth spaced from the upper rim of said feed barrel, means for advancing a charge column of said sponge iron at a variable rate upwardly through said feed barrel onto the overlying hearth, a radiation arch forming the top of said furnace and overlying said hearth and the top of said feed chute, and means for circulating a fluid heat absorbing medium around the outside of said furnace hearth to regenerate radiation losses therefrom.

14. In apparatus for producing refined metal from crude ore the combination with equipment for preparing and purifying charges of sponge iron from said ore, of an electrically heated underfeed refining furnace including an upright cylindrical feed barrel opening at its top onto an annular furnace hearth, means for conducting sponge iron from the aforementioned equipment into said feed barrel, electrodes of opposite polarity mounted respectively on the inner wall of said feed barrel and in the floor of the hearth spaced from the upper rim of said feed barrel, means for advancing a charge column of said sponge iron at a variable rate upwardly through said feed barrel onto the overlying hearth, and means for conducting molten metal formed at the top of the charge column adjacent the rim of said feed chute into an annular sump in said furnace hearth in such a way as to prevent short-circuiting electric arcs cast from the top of said charge column to the electrodes on the furnace hearth.

15. In apparatus for producing refined metal from crude iron ore the combination with equipment for preparing and purifying charges of sponge iron from said ore, of an electrically heated underfeed refining furnace including an upright cylindrical feed barrel opening at its top onto an annular furnace hearth, means for conducting sponge iron from the aforementioned equipment into the base of said feed chute, electrodes of opposite polarity mounted respectively on the inner wall of said feed chute and in the floor of the hearth spaced from the upper rim of said feed chute, means for advancing a charge column of said sponge iron at a variable rate upwardly through said feed chute onto the overlying hearth, a gas offtake leading off from the furnace above said hearth, a gas connection between said offtake and an annular nostril opening into the furnace feed chute, and additional gas connections between said offtake and the heating flues of the sponge iron reduction equipment and equipment used in generating electrical energy furnished to the refining furnace through the electrodes.

16. In apparatus for producing refined metal from its crude ore including equipment whereby the desired metal content of said ore is reduced to a relatively concentrated electrically conductant state, the combination of means for feeding said reduced ore upwardly in a column toward the overlying hearth of an electrically heated refining furnace, means for inducing a flow of electric current through said upwardly moving charge column, and means for adjusting the temperature to which the material at the top of said charge column is exposed, said means including equipment for varying the rate of feed of said charge material and the character of electric heat to which the top of said charge column is exposed.

17. In apparatus for producing refined metal from its crude ore including equipment whereby the desired metal content of said ore is reduced to a relatively concentrated electrically conductant state, the combination of a refining furnace comprising an annular hearth and a feed barrel opening into said hearth from below, means for introducing a charge of said reduced material at a controlled rate into said feed barrel, means for advancing said material upwardly through said feed barrel at a controlled rate to said hearth, electrodes of opposite polarity mounted respectively on the inner wall of the said feed barrel and in the floor of the hearth adjacent the upper rim of said feed barrel, and means for adjusting the distance separating said electrodes.

18. In apparatus for producing refined metal from its crude ore including equipment whereby the desired metal content of said ore is reduced to a relatively concentrated electrically conductant state, the combination of a refining furnace comprising a hearth and a feed barrel opening into said hearth from below, means for introducing a charge of said reduced material into said feed barrel, means for advancing said material upwardly through said feed barrel at a controlled rate to said hearth, electrodes of opposite polarity mounted respectively on the inner wall of the said feed barrel and in the floor of the hearth adjacent the upper rim of said feed barrel, means for adjusting the distance separating said electrodes, a source of high tension electric current connected to said electrodes, and power developing means connected respectively with said source of electric current and with a gas offtake leading from said furnace.

19. An electrically heated refining furnace including in combination an annular hearth having a central aperture opening in to a dependent feed barrel and a raised central boss surrounding said aperture and having an electric conductor imbedded therein, a plurality of electrodes embedded in said boss connected respectively with said conductor and with the floor of said hearth at spaced intervals about said central aperture, and radially extending channels in said boss between said electrodes arranged to conduct molten metal from the top of a charge column fed upwardly through said aperture to an annular sump in said hearth surrounding said boss without short circuiting electric arcs cast between said electrodes and the top of said charge column.

20. An electrically heated refining furnace including in combination an annular hearth having a central aperture opening into a dependent feed barrel and a raised central boss surrounding said aperture and having an electric conductor imbedded therein, a starting electrode movably mounted in said furnace overlying said hearth, a plurality of electrodes embedded in said boss connected respectively with said conductor and with the floor of said hearth at spaced intervals about said central aperture, and radially extending channels in said boss between said electrodes arranged to conduct molten metal from the top of a charge column fed upwardly through said aperture to an annular sump in said hearth surrounding said boss without short circuiting electric arcs cast between said electrodes and the top of said charge column.

In testimony whereof I affix my signature.
WINDER E. GOLDSBOROUGH.
In testimony whereof I affix my signature.
JOHN D. MORGAN.
In testimony whereof I affix my signature.
GEORGE HAMPTON WYCKOFF.